US012444105B2

(12) United States Patent
Cho et al.

(10) Patent No.: US 12,444,105 B2
(45) Date of Patent: Oct. 14, 2025

(54) TECHNIQUES FOR VISUALLY RENDERING A SET OF CHARACTERS AND OTHER ELEMENTS IN A VISUAL DESIGN

(71) Applicant: CIMPRESS SCHWEIZ GMBH, Winterthur (CH)

(72) Inventors: Jonathan Cho, Richmond, VA (US); Saurabh Kumar, Bihar (IN); Ramizuddin Khan, Ghazipur (IN); Rohan Halasur, Karnataka (IN); Ankur Tiwari, Maharashtra (IN); Vijay S. Reddy Pochampally, Maharashtra (IN); Anshul Garg, Bangalore (IN); Debashish Sahoo, Bangalore (IN)

(73) Assignee: CIMPRESS SCHWEIZ GMBH, Winterthur (CH)

( * ) Notice: Subject to any disclaimer, the term of this patent is extended or adjusted under 35 U.S.C. 154(b) by 186 days.

(21) Appl. No.: 18/149,400

(22) Filed: Jan. 3, 2023

(65) Prior Publication Data

US 2023/0222718 A1 Jul. 13, 2023

Related U.S. Application Data

(60) Provisional application No. 63/296,438, filed on Jan. 4, 2022.

(51) Int. Cl.

| | |
|---|---|
| ***G06T 11/60*** | (2006.01) |
| ***G06F 3/048*** | (2013.01) |
| ***G06F 40/10*** | (2020.01) |
| ***G06T 11/20*** | (2006.01) |

(52) U.S. Cl.
CPC ............ *G06T 11/60* (2013.01); *G06T 11/203* (2013.01)

(58) Field of Classification Search
CPC ...... G06T 11/60; G06T 11/203; G06T 11/001; G06T 7/90; G06T 2200/16; G06T 2200/24–28; G06T 19/20; G06F 3/0484; G06F 3/0481; G06F 40/166; G06F 40/106; G06F 40/197; G06F 40/103; G06F 30/00; G06F 8/38; G06F 8/34; G06F 8/451; G06F 16/958; G06F 16/9577; G06F 9/44; G06F 3/0482; G06F 3/0485; G06F 16/54
See application file for complete search history.

(56) References Cited

U.S. PATENT DOCUMENTS

| | | | | |
|---|---|---|---|---|
| 9,354,766 | B2 * | 5/2016 | Hanechak ............ | G06F 40/103 |
| 10,592,589 | B1 * | 3/2020 | Hsu ........................ | G06F 30/00 |

(Continued)

*Primary Examiner* — Wesner Sajous
(74) *Attorney, Agent, or Firm* — MARSHALL, GERSTEIN & BORUN LLP

(57) ABSTRACT

Systems and methods for visually rendering a set of characters in a visual design are disclosed. According to certain aspects, an electronic device may determine a position for a character sizing box within a container element of the visual design. Further, the electronic device may determine a placement location for a set of characters within the character sizing box. Additionally, the electronic device may generate and display a visual rendering of the visual design that may comprise the set of characters within the character sizing box which is positioned within the container element, where the visual rendering may comprise additional content positioned relative to the set of characters according to a layout format.

17 Claims, 8 Drawing Sheets

600

START

DETERMINE A POSITION FOR A CHARACTER SIZING BOX WITHIN A CONTAINER ELEMENT, THE POSITION BASED ON A SHAPE OF THE CONTAINER ELEMENT (605)

DETERMINE, BASED ON A SET OF CHARACTERISTICS OF A SET OF CHARACTERS, A PLACEMENT POSITION FOR THE SET OF CHARACTERS WITHIN THE CHARACTER SIZING BOX (610)

IDENTIFY A LAYOUT FORMAT OF THE SET OF CHARACTERS RELATIVE TO ADDITIONAL CONTENT OF A VISUAL DESIGN (615)

GENERATE A VISUAL RENDERING COMPRISING (i) THE SET OF CHARACTERS WITHIN THE CONTAINER ELEMENT ACCORDING TO THE PLACEMENT POSITION WITHIN THE CHARACTER SIZING BOX, AND (ii) THE ADDITIONAL CONTENT RELATIVE TO THE SET OF CHARACTERS ACCORDING TO THE LAYOUT FORMAT (620)

DISPLAY, IN A USER INTERFACE, THE VISUAL RENDERING (625)

STOP

(56) References Cited

U.S. PATENT DOCUMENTS

| | | | | |
|---|---|---|---|---|
| 2007/0180406 | A1* | 8/2007 | Hanechak | G06F 3/0481 715/837 |
| 2022/0114330 | A1* | 4/2022 | McClendon | G06F 40/14 |
| 2022/0350962 | A1* | 11/2022 | Hsu | G06F 3/0484 |
| 2023/0117793 | A1* | 4/2023 | Hsu | G06F 40/166 715/202 |

* cited by examiner

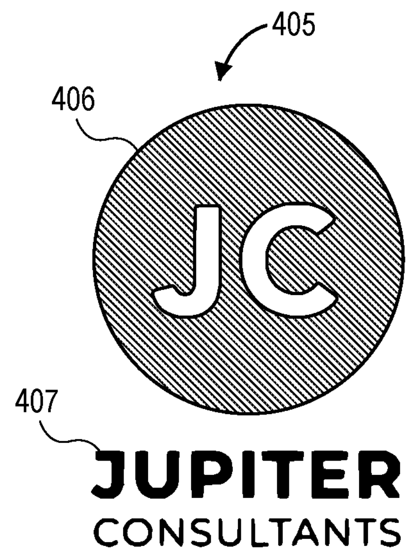
FIG. 4A
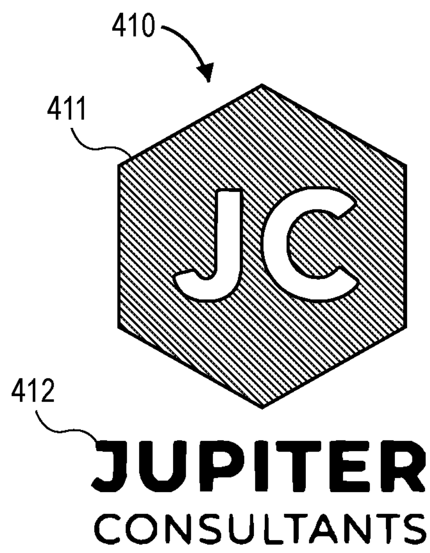
FIG. 4B
415
416 417
K KRYPTO
SECURITY SERVICES
FIG. 4C

TECHNIQUES FOR VISUALLY RENDERING A SET OF CHARACTERS AND OTHER ELEMENTS IN A VISUAL DESIGN

CROSS-REFERENCE TO RELATED APPLICATIONS

This application claims priority to U.S. Patent Application No. 63/296,438, filed Jan. 4, 2022, the disclosure of which is hereby incorporated by reference in its entirety.

FIELD

The present disclosure is directed to systems and methods for generating visual designs. In particular, the present disclosure is directed to platforms and techniques for positioning characters of a monogram within a logo or other type of visual design.

BACKGROUND

Businesses and companies design monograms and logos as a way to visually represent their brand and create a recognizable identity. Monograms and logos are often used on products, advertisements, and company documents, and they help to differentiate a company from its competitors and create a sense of professionalism and trust with consumers. Monograms and logos can also help to create a lasting impression and establish a brand's personality and values. Often, businesses or individuals look to create new visual designs, or edit existing visual designs, that incorporate monograms and logos.

However, creating a monogram containing one or more characters or letters, for example as part of a company logo, can be a difficult task. This is because the logo design must take into account the size and placement of the monogram within the overall design. If the logo does not have a specific container for the monogram or if there is no specification for how a monogram should fit within a container, it can be challenging to integrate the monogram seamlessly into the design. Additionally, the size of the monogram must be carefully considered in order to ensure that it is legible and does not overpower the rest of the logo. This can be especially tricky if the monogram contains multiple letters, as the letters must be arranged in a way that is aesthetically pleasing and easy to read. Thus, these tasks require careful consideration and attention to detail in order to create a cohesive and effective design.

Therefore, there is an opportunity for systems and methods to automatically determine how to position monogram characters within logos and other visual designs during the creation and/or editing of visual designs.

SUMMARY

In an embodiment, a computer-implemented method of visually rendering a set of characters in a visual design is provided. The computer-implemented method may include: determining, by at least one computer processor, a position for a character sizing box within a container element of the visual design, the position based on a shape of the container element; determining, by the at least one computer processor based on a set of characteristics of the set of characters, a placement position for the set of characters within the character sizing box; identifying, by the at least one computer processor, a layout format of the set of characters relative to additional content of the visual design; generating, by the at least one computer processor, a visual rendering of the visual design comprising (i) the set of characters within the container element according to the placement position within the character sizing box, and (ii) the additional content relative to the set of characters according to the layout format; and displaying, in a user interface, the visual rendering.

In another embodiment, a system for visually rendering a set of characters in a visual design is provided. The system may include: a user interface; a memory storing a set of computer-readable instructions; and at least one processor interfacing with the user interface and the memory, and configured to execute the set of computer-readable instructions to cause the at least one processor to: determine a position for a character sizing box within a container element, the position based on a shape of the container element of the visual design, determine, based on a set of characteristics of the set of characters, a placement position for the set of characters within the character sizing box, identify a layout format of the set of characters relative to additional content of the visual design, generate a visual rendering of the visual design comprising (i) the set of characters within the container element according to the placement position within the character sizing box, and (ii) the additional content relative to the set of characters according to the layout format, and cause the user interface to display the visual rendering.

In a further embodiment, a non-transitory computer-readable storage medium having stored thereon a set of instructions, executable by at least one processor, for visually rendering a set of characters in a visual design is provided. The set of instructions may include: instructions for determining a position for a character sizing box within a container element of the visual design, the position based on a shape of the container element; instructions for determining, based on a set of characteristics of the set of characters, a placement position for the set of characters within the character sizing box; instructions for identifying a layout format of the set of characters relative to additional content of the visual design; instructions for generating a visual rendering of the visual design comprising (i) the set of characters within the container element according to the placement position within the character sizing box, and (ii) the additional content relative to the set of characters according to the layout format; and instructions for displaying, in a user interface, the visual rendering.

BRIEF DESCRIPTION OF THE FIGURES

FIGS. 4A-4C also illustrate various visual designs and components thereof, in accordance with some embodiments.

DETAILED DESCRIPTION

Figure 1A:
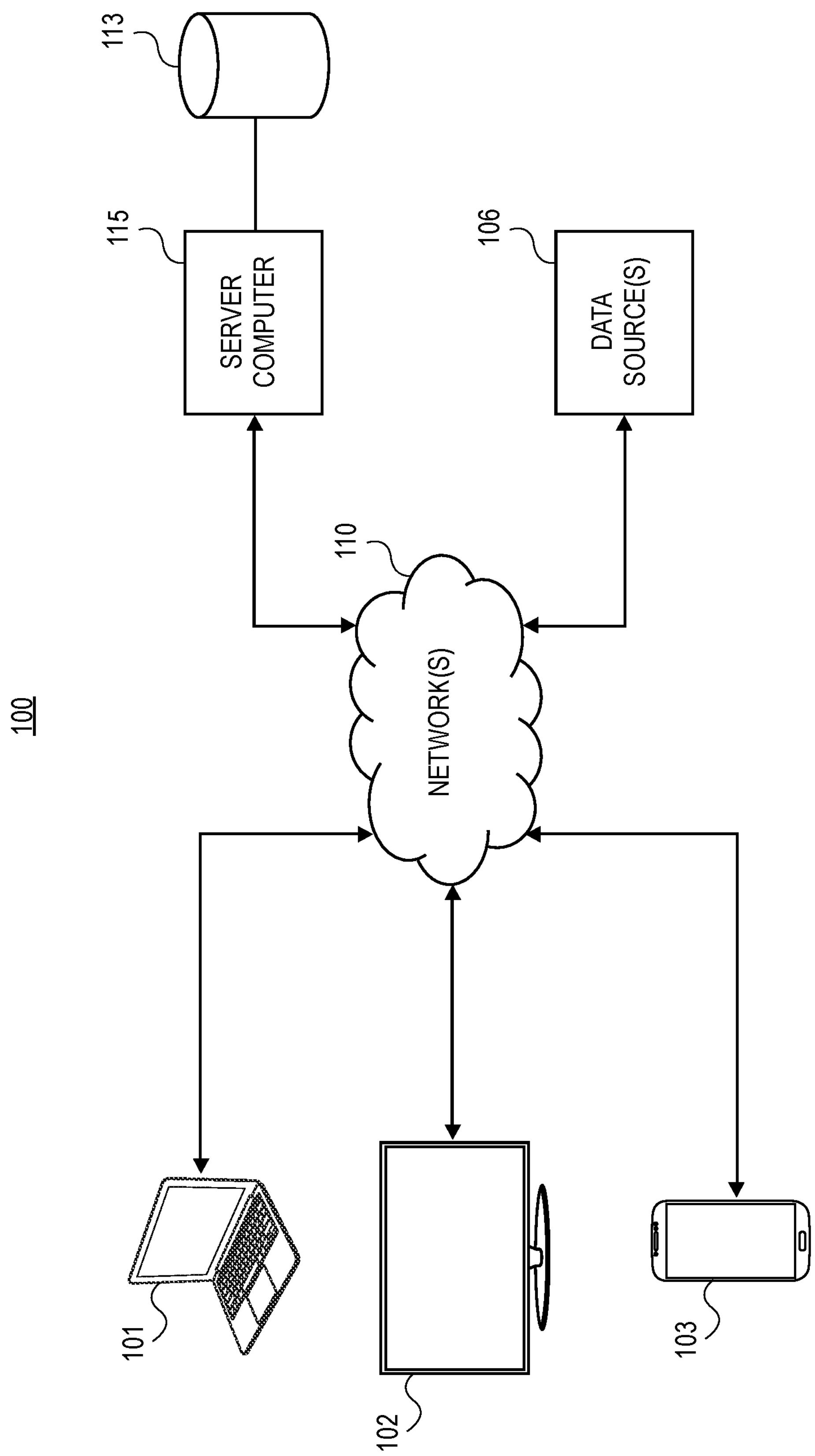
FIG. 1A depicts an overview of components and entities associated with the systems and methods, in accordance with some embodiments.

The present embodiments may relate to, inter alia, platforms and technologies for rendering visual designs that include various visual elements. According to certain aspects, the systems and methods may support automatically determining how to position a set of characters relative to other elements of a visual design, such as a logo, icon, textual content, and/or other elements. The systems and methods may further render a visual design according to the positioned characters as well as a layout format that specifies relative locations of elements included in the visual design. Generally, the systems and methods provide a flexible and versatile approach to visual design, resulting in visually appealing and effective designs for a wide range of applications, including to effectively convey an intended message or brand.

The systems and methods offer numerous benefits. It particular, the automatic placement of monogram characters within a logo or other type of visual design saves time and effort. Additionally, automatically positioning the monogram characters can ensure that the monogram is consistently legible and aesthetically pleasing within the logo design. These benefits can help to create a cohesive and professional appearance for the logo, which can be important for creating a strong brand identity. It should be appreciated that additional benefits are envisioned.

The systems and methods as discussed herein improve on the functioning of a computer and/or on other technologies, notably graphic design technologies. Existing graphic design technologies require a user to make manual adjustments to position a monogram within a visual design, which is time-consuming, error-prone, and can result in visual designs that are less aesthetically pleasing. By contrast, the described systems and methods utilize algorithms and calculations to determine the size and placement of monogram characters within logo and other visual designs, taking into account factors such as the size of the logo, the number of characters in the monogram, and the sizes and shapes of the characters. The systems and methods thus reduce and/or eliminate the number of user interface interactions while producing a visual design with a monogram that is legible and aesthetically pleasing. Additionally, these techniques are easily repeatable for multiple visual designs that incorporate the same or similar monogram, which allows for the effective and efficient creation of consistent branding for an entity across a wide range of applications. Moreover, manually positioning characters of a monogram within a visual design is prone to errors, such as uneven spacing or misaligned letters, and by virtue of the systems and methods automatically positioning the characters, the risk of these errors occurring in the present systems and methods is reduced.

Additionally, the systems and methods result in an improved user interface for electronic devices. In particular, the systems and methods automatically determine the placement, as displayed in a user interface of an electronic device, of characters within a certain portion of a visual design, which enables more effective use of the electronic device, particularly those with limited screen size (e.g., a smartphone). By automatically determining content placement in a visual design, the systems and methods result in a reduced amount of pop-up tools or selections that would normally be needed in manual design techniques, thus also resulting in saved screen space and improving the speed of a user's navigation through various views, interfaces, and windows.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of electronic devices 101, 102, 103. Each of the electronic devices 101, 102, 103 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like. Further, each of the electronic devices 101, 104, 105 may execute or interface with an design application or platform that enables the creating, sharing, and/or saving of digital visual design(s).

The electronic devices 101, 102, 103 may communicate with a server computer 115 via one or more networks 110. The server computer 115 may be associated with the entity that owns, operates, and/or manages the design application or platform. In particular, the server computer 115 may include or support a web server configured to host a website that enables users to operate the design application or platform. Further, the server computer 115 may support a software application executable by the set of electronic devices 101, 102, 103 (i.e., the set of electronic devices 101, 102, 103 may interface with the server computer 115 in executing the software application). In embodiments, the network(s) 110 may support any type of data communication via any standard or technology (e.g., GSM, CDMA, VOIP, TDMA, WCDMA, LTE, EDGE, OFDM, GPRS, EV-DO, UWB, Internet, IEEE 802 including Ethernet, WiMAX, Wi-Fi, Bluetooth, and others).

The server computer 115 may be configured to interface with or support a memory or storage 113 capable of storing various data, such as in one or more databases or other forms of storage. According to embodiments, the storage 113 may store data or information associated with digital designs, formats, templates, and/or design elements for the digital designs and templates. For example, the storage 113 may store templates of digital designs, including design elements for the different templates, where a design element may be a visual content such as a monogram (and characters thereof) or logo, and/or textual content such as a company or business name.

In additional or alternative embodiments, the server computer 115 may access the same or additional data or information from a set of data source(s) 106 via the network(s) 110. In this regard, the data source(s) 106 may compile, store, or otherwise access information associated with digital designs, formats, templates, and/or design elements for the digital designs and templates, where the data source(s) 106 may be associated with various entities such as business owners, companies, businesses, and/or the like.

Although depicted as a single server computer 115 in FIG. 1A, it should be appreciated that the server computer 115 may be in the form of a distributed cluster of computers, servers, machines, or the like. In this implementation, an entity may utilize the distributed server computer(s) 115 as part of an on-demand cloud computing platform. Accordingly, when the electronic devices 101, 102, 103 interface with the server computer 115, the electronic devices 101, 102, 103 may actually interface with one or more of a number of distributed computers, servers, machines, or the like, to facilitate the described functionalities. Similarly, although three (3) electronic devices 101, 102, 103 are depicted in FIG. 1A, it should be appreciated that greater or fewer amounts are envisioned.

Figure 1B:
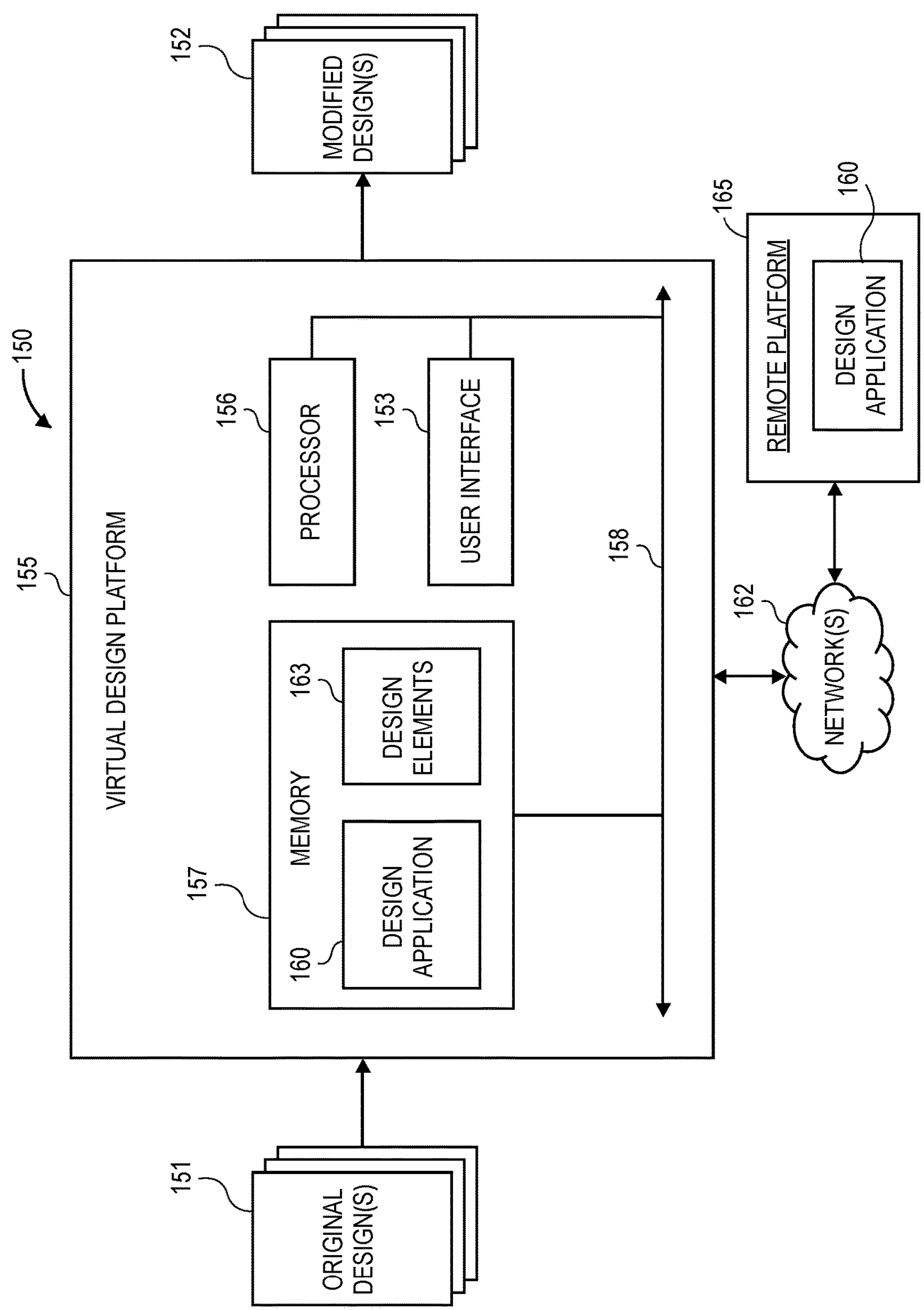
FIG. 1B depicts an overview of certain components configured to facilitate the systems and methods, in accordance with some embodiments.

According to embodiments, users of the electronic devices 101, 102, 103 may select a digital design(s) to create and/or modify using the electronic devices 101, 102, 103, such as in contemplation of sending, sharing (e.g., on one or more online services), or reproducing on physical items or products. The digital design(s) may include at least one digital image or video in various file formats (e.g., JPEG, TIFF, GIF, PNG, Raw, MP4, MOV, etc.), where the digital image(s) or video(s) may depict visual content (i.e., the design itself) that may be composed of one or more design elements. The users may use the respective electronic devices 101, 102, 103 to modify certain of the design elements and/or add/remove design elements from a given visual/digital design. FIG. 1B depicts more specific components associated with the systems and methods.

FIG. 1B an example environment 150 in which an original design(s) 151 is processed into a modified design(s) 152 via a virtual design platform 155, according to embodiments. The virtual design platform 155 may be implemented on any computing device, including one or more of the electronic devices 101, 102, 103 or the server computer 115 as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156. In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The virtual design platform 155 may further include a user interface 153 configured to present content (e.g., digital designs and components/elements thereof). Additionally, a user may make selections to the content via the user interface 153, such as to modify digital designs (or design elements thereof) presented thereon. The user interface 153 may be embodied as part of a touchscreen configured to sense touch interactions and gestures by the user. Although not shown, other system components communicatively coupled to the system bus 158 may include input devices such as a cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., a design application 160) data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The virtual design platform 155 may operate in a networked environment and communicate with one or more remote platforms, such as a remote platform 165, via a network(s) 162, such as a local area network (LAN), a wide area network (WAN), telecommunications network, or other suitable network. The remote platform 165 may be implemented on any computing device, including one or more of the electronic devices 101, 102, 103, or the server computer 115 as discussed with respect to FIG. 1A, and may include many or all of the elements described above with respect to the platform 155. In some embodiments, as will be described herein, the design application 160 as will be further described herein may be stored and executed by the remote platform 165 instead of by or in addition to the platform 155.

According to embodiments, the virtual design platform 155 (and more particularly, the design application 160) may process or modify the original design(s) 151 to produce the modified design(s) 152. Each of the original design(s) 151 and each of the modified design(s) 152 may be embodied as any type of electronic image, video, document, file, template, etc., that may include a set of design elements or components, each of which may include some type of displayable content (e.g., a combination of textual and/or visual content).

According to embodiments, the design application 160 may enable a user to select the original design 151. According to embodiments, the user may select the original design 151 from a set of templates, may search for the original design 151, or may create the original design 151 from a blank or saved electronic document.

Further, the design application 160 may enable the user to modify certain aspects of the original design(s) 151 to create modified design(s) 152, such as to share, communicate, reproduce as part of a physical item, or for another use. Generally, the design application 160 may enable the user to select or input an icon, monogram (and characters thereof), and/or other textual or visual content, where a collection of these elements may constitute a visual design. According to embodiments, the systems and methods may determine how to position characters (e.g., a set of characters in a monogram) within a corresponding container element or box such that the visual design is more uniform, balanced, and/or aesthetically pleasing, among other improvements.

According to embodiments, when the original design(s) 151 is created and/or modified using the design application 160, the virtual design platform 155 may output the modified design(s) 152. The virtual design platform 155 may store the modified design(s) 152 in the memory 157 or other storage, and/or may communicate the modified design(s) 152 to various entities and/or devices.

According to embodiments, the original design(s) 151 and the modified design(s) 152 may include at least one digital image or video in various file formats (e.g., JPEG, TIFF, GIF, PNG, Raw, MP4, MOV, etc.). The memory 157 may further store design elements 163 accessible to the design application 160 such as, for example, images, logos, monograms, character fonts, attributes of characters (e.g., sizes, thicknesses, presence of ascenders and/or descenders, etc.), various textual content, and/or other information.

FIGS. 2, 3, 4A-C, 5A, and 5B illustrate example elements, interfaces, and the like associated with a virtual design platform, where the virtual design platform may support a design application (such as the design application 160 as discussed with respect to FIG. 1B). The example elements, interfaces, and the like, thus, may be example elements and interfaces of the design application. An electronic device may execute the design application and display the example elements and interfaces in a user interface and receive selections associated with the example interfaces via the user interface.

Figure 2:
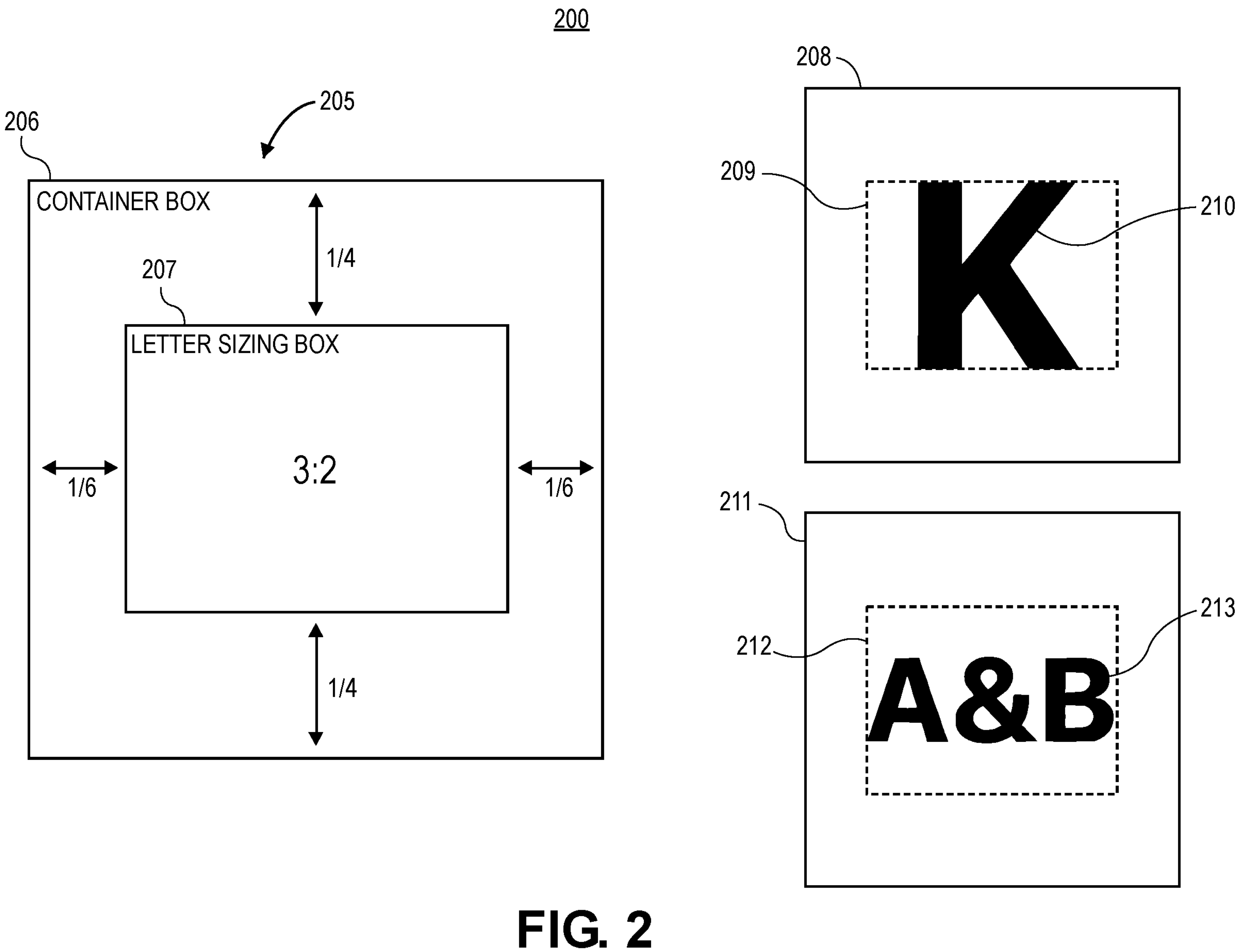
FIG. 2 illustrates various visual designs and components thereof, in accordance with some embodiments.

FIG. 2 depicts an example representation 200 associated with aligning design elements of a visual rendering. The representation 200 includes a depiction 205 of a container element 206 and a character sizing box 207. As depicted in FIG. 2, the container element 206 is a square shape with an aspect ratio of 1:1 and the character sizing box 207 is a rectangle shape with an aspect ratio of 3:2. It should be appreciated that other shapes and aspect ratios for the container element 206 and the character sizing box 207 are envisioned.

As further depicted in FIG. 2, the character sizing box 207 is centered, width- and height-wise, within the container element 206. An offset equal to ⅙ of the width of the container element 206 is present on each side of the character sizing box 207 and an offset equal to ¼ of the height of the container element 206 is present on the top and bottom of the character sizing box 207. It should be appreciated that alternative offsets are envisioned.

FIG. 2 further depicts a rendering of a character sizing box 209 that is centered within a container element 208, where a character “K” 210 is positioned within the character sizing box 209. The top and bottom sides of the character “K” 210 respectively extend to the top and bottom sides of the character sizing box 209, where the character “K” 210 is centered, width-wise, within the character sizing box 209.

Additionally, FIG. 2 depicts a rendering of a character sizing box 212 that is centered within a container element 211, where a set of characters “A&B” 213 is positioned within the character sizing box 212. The left and right sides of the set of characters “A&B” 213 respectively extend to the left and right sides of the character sizing box 212, where the set of characters “A&B” 213 is centered, height-wise, within the character sizing box 212.

Figure 3:
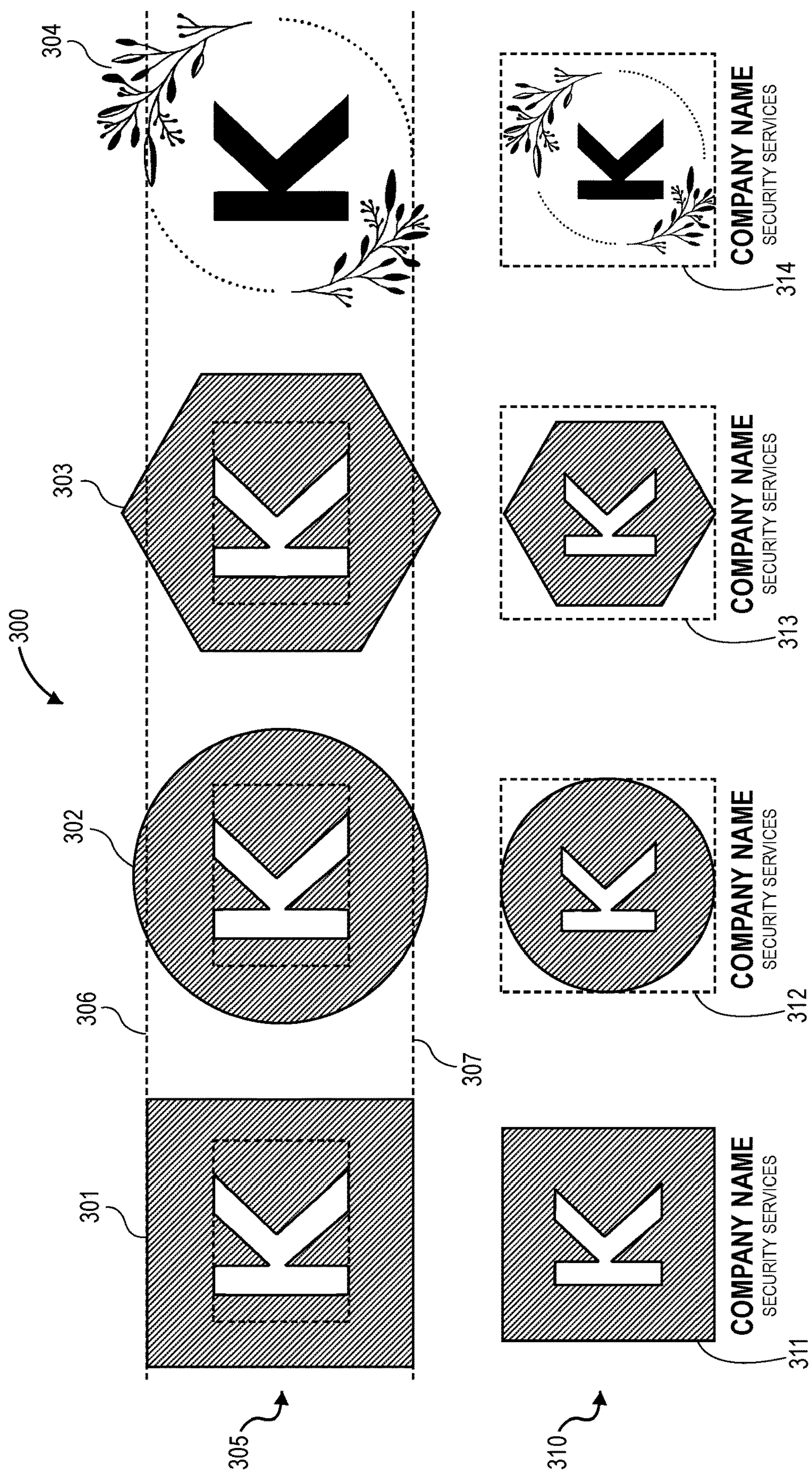
FIG. 3 also illustrates various visual designs and components thereof, in accordance with some embodiments.

FIG. 3 depicts an example representation 300 of different shapes and sizes of container elements in which character sizing boxes and characters may be positioned. In particular, as depicted in FIG. 3, a container element may be the following shapes: square 301 (or rectangle), circle 302, hexagon 303, or another design 304. It should be appreciated that other shapes and/or designs for the container element are envisioned.

As illustrated in FIG. 3, the character sizing boxes and the character “K” in each of the square 301, circle 302, hexagon 303, and another design 304 are the same size. Further, the top and bottom edges of the square 301 extend to respective boundary lines 306, 307. In contrast, at least a portion of the dimensions for each of the circle 302, the hexagon 303, and the another design 304, extend past the boundary lines 306, 307, to maintain a similar size balance between the character sizing boxes and the character “K” and the respective circle 302, hexagon 303, and another design 304. These designs and shapes thereof are depicted in a row 305 of the representation 300.

As further illustrated in FIG. 3, a row 310 of the representation 300 depicts a square 311 (or rectangle), circle 312, hexagon 313, and another design 314, similar to the shapes/designs 301, 302, 303, and 304 of the row 305. In contrast to the shapes/designs 301, 302, 303, 304 of the row 305, the dimensions of the shapes/designs 311, 312, 313, and 314 of the row 310 are the same maximum height and/or width. As a result, the character sizing boxes and the character “K” in each of the shapes/designs 311, 312, 313, and 314 are different sizes. Thus, according to embodiments, a computing device may calculate sizes of the respective character sizing boxes and character(s) thereof based on a combination of the maximum height, maximum width, and/or shape of the respective character sizing box.

As additionally depicted in FIG. 3, each of the designs in the row 310 includes textual content (e.g., a company name, a description of the company, and/or other content; as shown, “Company Name Security Services”). Although positioned below the square 301, circle 302, hexagon 303, and another design 304, the textual content may be positioned in any location/position relative to the components of the respective design (e.g., the container element, the character sizing box, additional features of the design, etc.).

According to embodiments, an electronic device may determine how to position a character sizing box within a container element based on a shape, size, and/or dimensions of the container element, and/or on a set of rules that may be default or configurable by a user. For example, a rule may specify that a character sizing box is offset a certain percent of the width and/or height of the container element. Additionally, the electronic device may determine how to position a given set of characters within a character sizing box based on an amount of characters, a weight of the set of characters, a font and/or thickness of the set of characters, a presence of an ascender(s) or descender(s) in a character(s), and/or other factors.

Generally, the position of an alphanumeric character(s) within a character sizing box (and therefore within container element) is important for visual balance and symmetry. When the character is centered (e.g., within a character sizing box), it creates a sense of stability and order, which can make the overall design more aesthetically pleasing and easier for the viewer to process.

The “weight” of an alphanumeric character may refer to its visual mass or the amount of space it occupies, where the weight of the character can be used to determine its horizontal and vertical center. For example, a character with a heavier weight may be centered based on its vertical center, while a character with a lighter weight may be centered based on its horizontal center. This allows the character to be evenly balanced within the character sizing box, creating a harmonious and cohesive visual design.

Further, an ascender or descender is a part of an alphanumeric character that extends above or below the typical height of the character. For example, in the lowercase letters “b,” “d,” “f,” “h,” “k,” “l,” and “t,” the part of the letter that extends above the median line is called the ascender. In the lowercase letters “g,” “j,” “p,” “q,” and “y,” the part of the letter that extends below the baseline is called the descender.

It is important for an alphanumeric character with an ascender or descender to be centered within a character sizing box based on the presence of an ascender or descender because an ascender or descender adds visual weight to the character, which can misalign the balance and symmetry of an overall design. Centering a character based on the presence of an ascender or descender results in the visual weight of the character being evenly distributed within the character sizing box, which also results in a more harmonious and cohesive visual design.

The computing device and/or application executing thereon may account for a weight of a character (and/or on a presence of an ascender or descender) when determining how to center the character in the respective character sizing box. For example, the character "K" as multiplicatively depicted in FIG. 3 has a weight such that its visual center is to the left of the center of its character sizing box. As a result, the computing device and/or application executing thereon may shift the character "K" to the right such that its visual center aligns (or more closely aligns) with the center of its character sizing box. It should be appreciated that a given character may be adjusted vertically and/or horizontally based on its weight and associated visual center, as well as a presence of an ascender or descender.

It should be appreciated that the computing device may account for additional characteristics of a given character or set of characters in determining whether to shift or adjust the character(s) within a given character sizing box. For example, the computer device may account for one or more of the following: the font style and size of the character, the amount of whitespace around the character, the color of the character and its surrounding background, the angle of the character within the character sizing box, the presence of other elements within the character sizing box that may distract from the centered alignment of the character, the overall layout and design of the character sizing box and its surrounding context (e.g., the container element), and/or the legibility of the character, which can be influenced by factors such as font style, kerning, and leading.

Additionally, a given visual design may incorporate one or more icons or other visual elements. A given icon may have multiple colors, each with its own darkness value or metric, where the darkness value of a color refers to the relative lightness or darkness of the color, with a higher value indicating a darker color and a lower value indicating a lighter color. The darkness values of the colors in an icon may be used to maintain visual consistency and harmony within the icon and its surrounding design. When an icon is recolored to align with a different color palette, it may be desirable to ensure that the darkness values of the colors in the recolored icon match the original darkness values of the colors in the original icon so as to help maintain the visual balance and hierarchy of the icon, as well as its overall aesthetic appeal.

For example, if the original icon has a blue color with a high darkness value and a yellow color with a low darkness value, and a recolored icon features replaces blue with red and yellow with green, the recolored icon should also have a red color with a high darkness value and a green color with a low darkness value. The electronic device may perform these calculations and recoloring based on embedded data or data determined from a given icon and components thereof.

FIGS. 4A-4C illustrate different layouts for a visual design, such as a logo or other type of design. Generally, a visual design or logo may include a combination of a visual element and textual content, such as a company name. The visual element and textual content can be positioned in different ways to create a unique and effective logo design.

For example, FIG. 4A illustrates a logo 405 in a stacked, fit-width layout such that a visual icon 406 is positioned above textual content 407, and where the width of the visual icon 406 is the same (or close to) the width of the textual content 407. In embodiments, the visual icon 406 may be positioned below the textual content 407. Generally, a stacked, fit-width layout may be effective for creating a hierarchical relationship between the icon and the text, with the icon serving as a visual representation of the company and the text providing additional information or context.

Similar, in a "hat stack" layout, the visual icon may be positioned on top of the textual content, with the textual content appearing as a "hat" on top of the visual icon and having a width that is smaller than the width of the visual icon. Generally, a "hat stack" layout positions the visual icon and the textual content as separate but interconnected elements within the logo.

FIG. 4B illustrates a hat stack layout of a logo 410 such that a visual icon 411 is positioned above textual content 412, and where the width of the visual icon 411 is less than the width of the textual content 412. In embodiments, the visual icon 411 may be positioned below the textual content 412.

In a side-by-side layout, such as a logo 415 as illustrated in FIG. 4C, a visual icon 416 and textual content 417 are positioned next to each other, with the visual icon 416 and the textual content 417 appearing as separate elements within the logo. Generally, a side-by-side layout may be effective for creating a balanced and symmetrical design, as it positions the icon and text as equally important elements within the logo.

Generally, different fonts (i.e., sets of standardized designs for characters) exist for alphanumeric characters, where each font has its own unique visual style, including details such as the shape and thickness of the characters' strokes. Overall, the stroke width of a given font may have an impact on the visual appearance and readability of the alphanumeric characters.

Some fonts have consistent stroke widths, meaning that all of the characters in the font have strokes of the same thickness. For example, a font with consistent stroke widths may have all of its characters with thin strokes, or all of its characters with thick strokes, which may create a clean and uniform visual appearance, as all of the characters have a consistent visual weight.

Other fonts have variable stroke widths, meaning that the thickness of the characters' strokes can vary depending on the character and on different portions of the character. For example, a font with variable stroke widths may have some characters with thin strokes and others with thick strokes, or some characters with strokes that are thick in some areas and thin in others. This type of font can create a dynamic and distinctive visual appearance, as the characters have a range of visual weights.

A given visual element that may include one or more characters and an outline that aligns with a container element (i.e., traces the boundary edges of the container element), where the outline has a given thickness. According to embodiments, the systems and methods may determine a thickness of an outline based on the stroke width of the associated character(s).

Figure 5A:
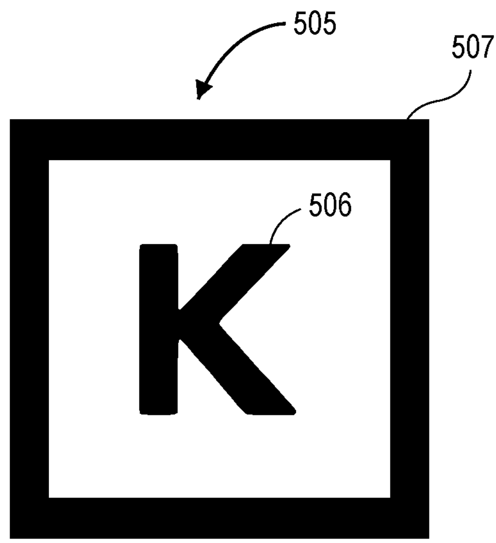
FIGS. 5A and 5B also illustrate various visual designs and components thereof, in accordance with some embodiments.

FIG. 5A depicts a visual design 505 having a character "K" 506 that is surrounded by an outline 507 that aligns with a container element. The font of the character "K" 506 has a consistent stroke width. As illustrated in FIG. 5A, a width of the outline 507 matches (or closely matches) the stroke width of the font for the character "K" 506.

Figure 5B:
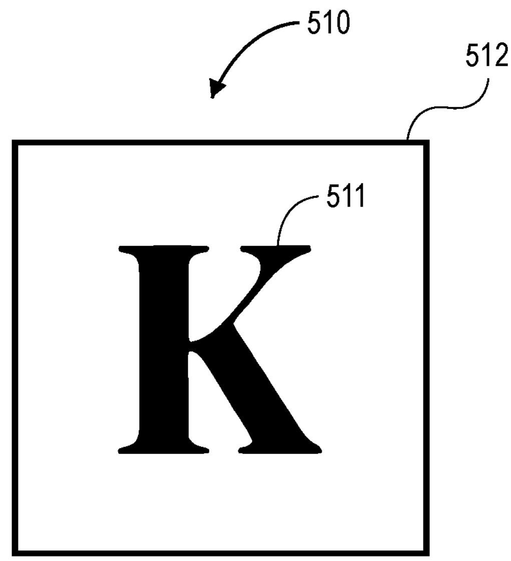

FIG. 5B depicts a visual design 510 having a character "K" 511 that is surrounded by an outline 512 that aligns with a container element. The font of the character "K" 511 has a variable stroke width, where the top right stroke of the character "K" 511 is thinner than the remainder of the character "K" 511. As illustrated in FIG. 5A, a width of the outline 512 matches (or closely matches) the smallest stroke width of the font for the character "K" 511.

Figure 6:
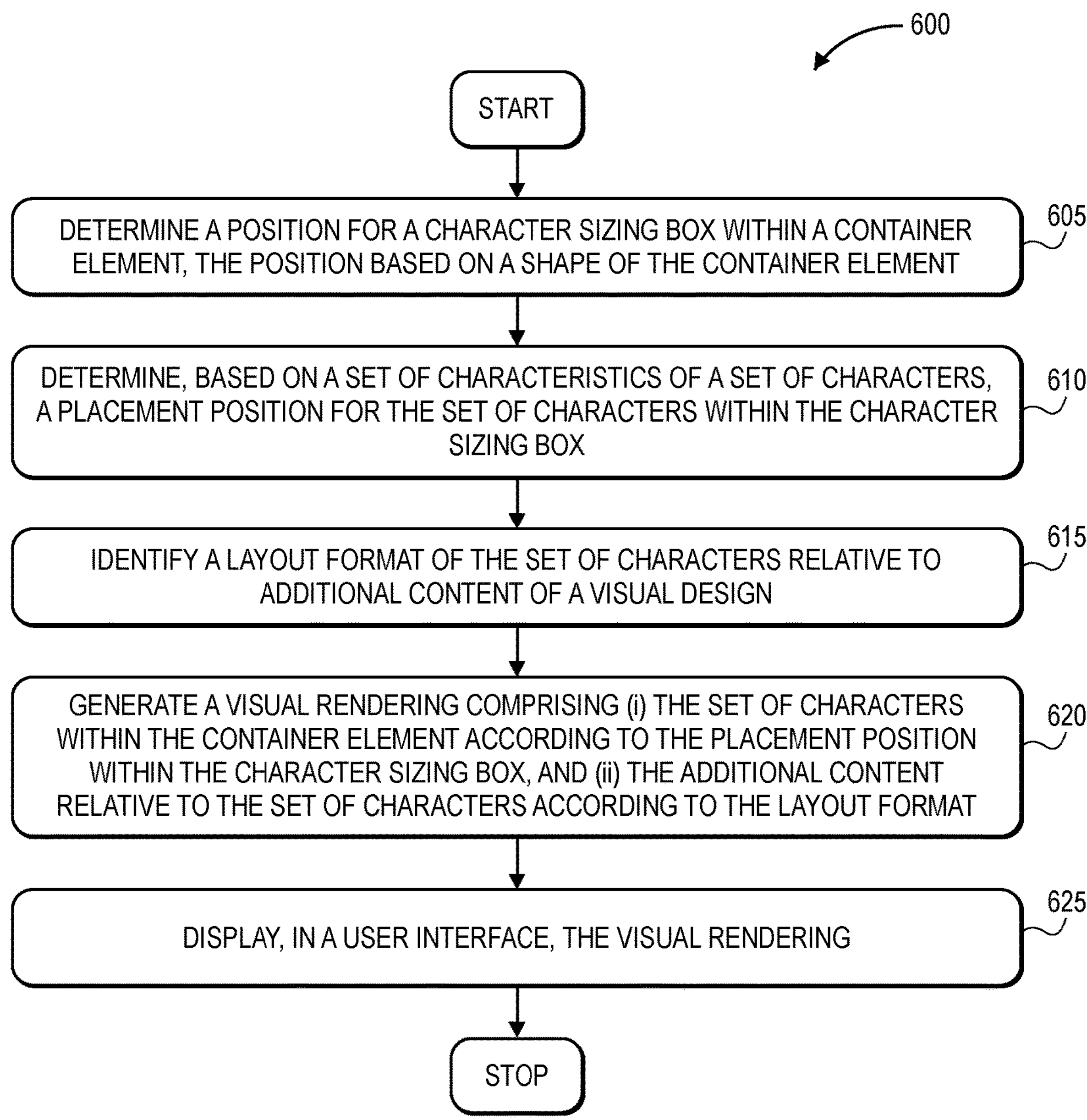
FIG. 6 depicts an example flow diagram associated with visually rendering a set of characters in a visual design, in accordance with some embodiments

FIG. 6 depicts a block diagram of an example method 600 of visually rendering a set of characters in a visual design. The method 600 may be facilitated by an electronic device (such as any of the devices 101, 102, 103 as depicted in FIG. 1A) that may be in communication with a server(s) (such as the server computer 115 as discussed with respect to FIG. 1A). In embodiments, the method 600 may be at least partially facilitated by a remote server, such as the server computer 115 as discussed with respect to FIG. 1A. Further, the electronic device may operate or interface with a virtual design platform, such as via a website, application, or the like.

The method 600 may begin when the electronic device determines (block 605) a position for a character sizing box within a container element, where the position may be based on a shape of the container element. According to embodiments, the shape of the container element may be a rectangle, square, circle, or other regular or irregular shape. Further, in embodiments, an aspect ratio of the character sizing box may (or may not be) the same as an aspect ratio of the container element. In embodiments, the position for the character sizing box within the container element may be additionally or alternatively be based on a size and/or dimensions of the container element, a rule specifying offset amounts or percentages, and/or other factors.

The electronic device may determine (block 610), based on a set of characteristics of a set of characters, a placement position for the set of characters within the character sizing box. In embodiments, the set of characteristics may be an amount of characters, a size/dimensions of each character, character fonts, and/or other elements. In particular, the set of characters may extend, width-wide and/or height-wise, to respective edges of the character sizing box. Further, in embodiments, the electronic device may center, based on a set of weights of the set of characters, the set of characters within the character sizing box. Additionally, in embodiments, the electronic device may adjust, within the character sizing box, the set of characters based on at least one of an ascender or a descender present in the set of characters.

The electronic device may identify (block 615) a layout format of the set of characters relative to additional content of the visual design. According to embodiments, the layout format may be a stacked layout format, a size-by-side layout format, or another layout format.

The electronic device may generate (block 620) a visual rendering comprising (i) the set of characters within the container element according to the placement position within the character sizing box, and (ii) the additional content relative to the set of characters according to the layout format. In embodiments, the electronic device may generate the visual rendering further comprising an outline of the container element, wherein a thickness of the outline is based on a font of the set of characters. Further, in embodiments in which the layout format is the stacked layout format, the container element may be depicted on top of the additional content and a width of the container element may match a width of the additional content.

The electronic device may display (block 625), in a user interface, the visual rendering. According to embodiments, a user of the electronic device may use the electronic device to edit the visual rendering, such as to modify any elements of the visual rendering, to add/remove certain elements, or to perform alternative edits.

Figure 7:
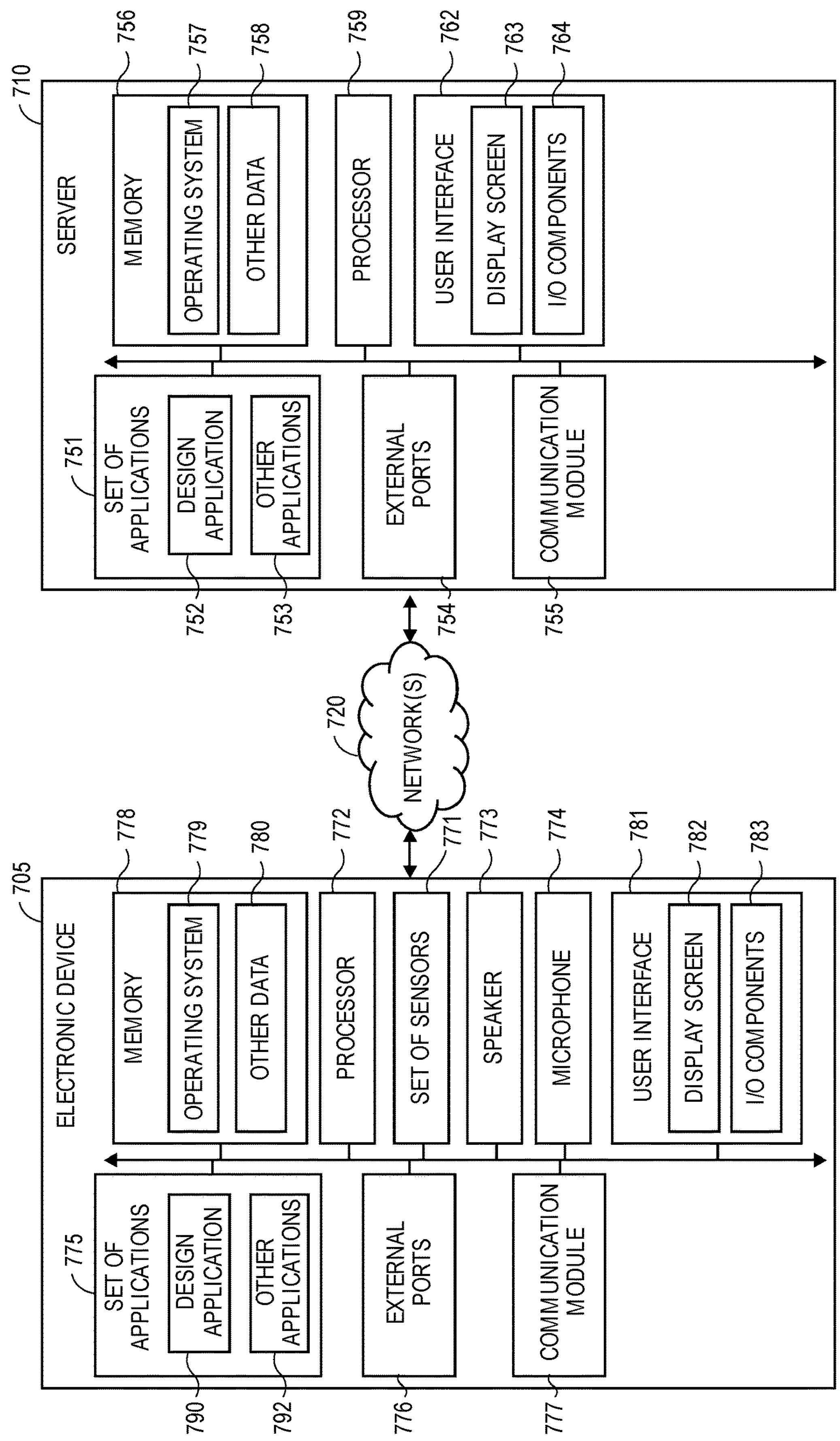
FIG. 7 is a block diagram of an example electronic device and an example server, in accordance with some embodiments.

FIG. 7 illustrates a hardware diagram of an example electronic device 705 (such as one of the electronic devices 101, 102, 103 as discussed with respect to FIG. 1A) and an example computing system 710 (such as the server computer 115 as discussed with respect to FIG. 1A), in which the functionalities as discussed herein may be implemented.

The electronic device 705 may include a processor 772 as well as a memory 778. The memory 778 may store an operating system 779 capable of facilitating the functionalities as discussed herein as well as a set of applications 775 (i.e., machine readable instructions). For example, one of the set of applications 775 may be a design application 790 configured to facilitate various of the visual design creating and editing functionalities as discussed herein. It should be appreciated that one or more other applications 792 are envisioned.

The processor 772 may interface with the memory 778 to execute the operating system 779 and the set of applications 775. According to some embodiments, the memory 778 may also include other data 780 including, for example, design elements associated with visual designs. The memory 778 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 705 may further include a communication module 777 configured to communicate data via one or more networks 720. According to some embodiments, the communication module 777 may include one or more transceivers (e.g., WWAN, WLAN, and/or WPAN transceivers) functioning in accordance with IEEE standards, 3GPP standards, or other standards, and configured to receive and transmit data via one or more external ports 776.

The electronic device 705 may include a set of sensors 771 such as, for example, a location module (e.g., a GPS chip), an image sensor, an accelerometer, a clock, a gyroscope, a compass, a yaw rate sensor, a tilt sensor, telematics sensors, and/or other sensors. The electronic device 705 may further include a user interface 781 configured to present information to a user and/or receive inputs from the user. As shown in FIG. 7, the user interface 781 may include a display screen 782 and I/O components 783 (e.g., ports, capacitive or resistive touch sensitive input panels, keys, buttons, lights, LEDs). According to some embodiments, the user may access the electronic device 705 via the user interface 781 to review information such as visual designs and elements thereof, make selections, and/or perform other functions. Additionally, the electronic device 705 may include a speaker 773 configured to output audio data and a microphone 774 configured to detect audio.

In some embodiments, the electronic device 705 may perform the functionalities as discussed herein as part of a "cloud" network or may otherwise communicate with other hardware or software components within the cloud to send, retrieve, or otherwise analyze data.

As illustrated in FIG. 7, the electronic device 705 may communicate and interface with the computing system 710 via the network(s) 720. The computing system 710 may include a processor 759 as well as a memory 756. The memory 756 may store an operating system 757 capable of facilitating the functionalities as discussed herein as well as a set of applications 751 (i.e., machine readable instructions). For example, one of the set of applications 751 may be a design application 752 configured to facilitate various of the functionalities discussed herein. It should be appreciated that one or more other applications 753 are envisioned.

The processor 759 may interface with the memory 756 to execute the operating system 757 and the set of applications 751. According to some embodiments, the memory 756 may include other data 758 including, for example, design elements associated with visual designs. The memory 756 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The computing system 710 may further include a communication module 755 configured to communicate data via the one or more networks 720. According to some embodiments, the communication module 755 may include one or more transceivers (e.g., WWAN, WLAN, and/or WPAN transceivers) functioning in accordance with IEEE standards, 3GPP standards, or other standards, and configured to receive and transmit data via one or more external ports 754.

The computing device 710 may further include a user interface 762 configured to present information to a user and/or receive inputs from the user. As shown in FIG. 7, the user interface 762 may include a display screen 763 and I/O components 764 (e.g., ports, capacitive or resistive touch sensitive input panels, keys, buttons, lights, LEDs). According to some embodiments, the user may access the computing device 710 via the user interface 762 to review information, make changes, input training data, and/or perform other functions.

In some embodiments, the computing device 710 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 772, 759 (e.g., working in connection with the respective operating systems 779, 757) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of visually rendering a set of characters in a visual design, the computer-implemented method comprising:
- determining, by at least one computer processor, a position for a character sizing box within a container element of the visual design, the position based on a shape of the container element;
- determining, by the at least one computer processor based on a horizontal center and a vertical center of each of the set of characters, a placement position for the set of characters to be centered within the character sizing box;
- identifying, by the at least one computer processor, a layout format of the set of characters relative to additional content of the visual design;
- generating, by the at least one computer processor, a visual rendering of the visual design comprising (i) the set of characters within the container element according to the placement position within the character sizing box, and (ii) the additional content relative to the set of characters according to the layout format; and
- displaying, in a user interface, the visual rendering.

2. The computer-implemented method of claim 1, wherein an aspect ratio of the character sizing box is not the same as an aspect ratio of the container element.

3. The computer-implemented method of claim 1, wherein generating the visual rendering comprises:
- generating, by the at least one computing processor, the visual rendering further comprising an outline of the container element, wherein a thickness of the outline is based on a font of the set of characters.

4. The computer-implemented method of claim 1, wherein the layout format is either a stacked layout format or a side-by-side layout format.

5. The computer-implemented method of claim 4, wherein when the layout format is the stacked layout format, the container element is depicted on top of the additional content, where a width of the container element matches a width of the additional content.

6. The computer-implemented method of claim 1, further comprising:
- adjusting, by the at least one computer processor within the character sizing box, the set of characters based on at least one of an ascender or a descender present in the set of characters.

7. A system for visually rendering a set of characters in a visual design, comprising:
- a user interface;
- a memory storing a set of computer-readable instructions; and at least one processor interfacing with the user interface and the memory, and configured to execute the set of computer-readable instructions to cause the at least one processor to:

determine a position for a character sizing box within a container element, the position based on a shape of the container element of the visual design, determine, based on a horizontal center and a vertical center of each of the set of characters, a placement position for the set of characters to be centered within the character sizing box, identify a layout format of the set of characters relative to additional content of the visual design, generate a visual rendering of the visual design comprising (i) the set of characters within the container element according to the placement position within the character sizing box, and (ii) the additional content relative to the set of characters according to the layout format, and cause the user interface to display the visual rendering.

8. The system of claim 7, wherein an aspect ratio of the character sizing box is not the same as an aspect ratio of the container element.

9. The system of claim 7, wherein to generate the visual rendering, the at least one processor is configured to:

generate the visual rendering further comprising an outline of the container element, wherein a thickness of the outline is based on a font of the set of characters.

10. The system of claim 7, wherein the layout format is either a stacked layout format or a side-by-side layout format.

11. The system of claim 10, wherein when the layout format is the stacked layout format, the container element is depicted on top of the additional content, where a width of the container element matches a width of the additional content.

12. The system of claim 7, wherein the at least one processor is configured to execute the set of computer-readable instructions to further cause the at least one processor to:

adjust, within the character sizing box, the set of characters based on at least one of an ascender or a descender present in the set of characters.

13. A non-transitory computer-readable storage medium having stored thereon a set of instructions, executable by at least one processor, for visually rendering a set of characters in a visual design, the set of instructions comprising:

instructions for determining a position for a character sizing box within a container element of the visual design, the position based on a shape of the container element;

instructions for determining, based on a horizontal center and a vertical center of each of the set of characters, a placement position for the set of characters to be centered within the character sizing box;

instructions for identifying a layout format of the set of characters relative to additional content of the visual design;

instructions for generating a visual rendering of the visual design comprising (i) the set of characters within the container element according to the placement position within the character sizing box, and (ii) the additional content relative to the set of characters according to the layout format; and instructions for displaying, in a user interface, the visual rendering.

14. The non-transitory computer-readable storage medium of claim 13, wherein an aspect ratio of the character sizing box is not the same as an aspect ratio of the container element.

15. The non-transitory computer-readable storage medium of claim 13, wherein the instructions for generating the visual rendering comprise:

instructions for generating, by the at least one computing processor, the visual rendering further comprising an outline of the container element, wherein a thickness of the outline is based on a font of the set of characters.

16. The non-transitory computer-readable storage medium of claim 13, wherein the layout format is either a stacked layout format or a side-by-side layout format.

17. The non-transitory computer-readable storage medium of claim 16, wherein when the layout format is the stacked layout format, the container element is depicted on top of the additional content, where a width of the container element matches a width of the additional content.

* * * * *